United States Patent
Anural et al.

(10) Patent No.: US 7,340,743 B1
(45) Date of Patent: Mar. 4, 2008

(54) MASTERLESS LOCKS IN A MULTI-NODE ENVIRONMENT

(75) Inventors: Anurag Anural, Sunnyvale, CA (US); Harold Bailey Prince, Jr., Palo Alto, CA (US); Ramesh Balan, Cupertino, CA (US); Murali Nagaraj, Pune (IN); Balemurughan Kumaresan, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 618 days.

(21) Appl. No.: 10/423,146

(22) Filed: Apr. 25, 2003

(51) Int. Cl.
G06F 9/46 (2006.01)
G06F 15/16 (2006.01)
G06F 12/00 (2006.01)
G06F 13/00 (2006.01)
G06F 13/28 (2006.01)
G06F 7/04 (2006.01)
G00F 15/173 (2006.01)

(52) U.S. Cl. ................ 718/104; 709/217; 709/223; 709/225; 709/226; 711/150; 711/152; 726/2; 726/3; 707/8; 710/28; 710/36; 710/200

(58) Field of Classification Search ........ 709/217–219, 709/223, 225–226; 726/2, 3; 718/104; 707/8; 710/200, 28, 36; 711/150, 152
See application file for complete search history.

(56) References Cited

U.S. PATENT DOCUMENTS

| | | | |
|---|---|---|---|
| 4,965,719 A * | 10/1990 | Shoens et al. | 711/100 |
| 6,108,654 A * | 8/2000 | Chan et al. | 707/8 |
| 6,185,601 B1 | 2/2001 | Wolff | 709/203 |
| 6,272,491 B1 | 8/2001 | Chan et al. | 707/8 |
| 6,385,613 B1 * | 5/2002 | Grewell et al. | 707/8 |
| 6,405,274 B1 * | 6/2002 | Chan | 710/200 |
| 6,529,906 B1 | 3/2003 | Chan | 707/8 |
| 6,574,654 B1 * | 6/2003 | Simmons et al. | 718/104 |
| 6,618,744 B1 * | 9/2003 | Simmons et al. | 718/104 |
| 6,668,270 B1 * | 12/2003 | Simmons et al. | 718/104 |
| 6,668,295 B1 * | 12/2003 | Chan | 710/200 |
| 6,697,901 B1 | 2/2004 | Chan | 710/200 |
| 6,704,767 B1 | 3/2004 | Simmons et al. | 718/104 |
| 6,708,198 B1 | 3/2004 | Simmons et al. | 718/104 |
| 6,715,146 B1 | 3/2004 | Simmons et al. | 718/104 |
| 6,751,616 B1 * | 6/2004 | Chan | 707/8 |
| 6,782,462 B2 * | 8/2004 | Marion et al. | 711/170 |
| 6,826,570 B1 * | 11/2004 | Eshel et al. | 707/8 |

(Continued)

Primary Examiner—William Thomson
Assistant Examiner—Qing-Yuan Wu
(74) Attorney, Agent, or Firm—Campbell Stephenson LLP

(57) ABSTRACT

A method, system, application programming interface, computer system, and computer program product to provide locks for controlling access to data by nodes in a multi-node environment while minimizing messages sent between nodes. Based upon knowledge of lock usage in the multi-node environment, a multi-node knowledge agent can determine when no other node is accessing data protected by a given lock, as well as when an event has occurred that precedes a request by another node to access data protected by the given lock. When no other node is accessing data and no such event has occurred, the multi-node knowledge agent can designate that given lock as "masterless." A lock agent on the node hosting the multi-node knowledge agent is authorized to subsequently grant access to the data protected by the masterless lock to clients on that node without communicating with a lock master, which may reside at another node.

20 Claims, 8 Drawing Sheets

U.S. PATENT DOCUMENTS

| | | | |
|---|---|---|---|
| 6,850,938 B1 * | 2/2005 | Sadjadi | 707/8 |
| 6,920,454 B1 | 7/2005 | Chan | 707/8 |
| 6,965,893 B1 * | 11/2005 | Chan et al. | 707/8 |
| 7,073,176 B1 * | 7/2006 | Simmons et al. | 718/104 |
| 7,150,019 B1 * | 12/2006 | Simmons et al. | 718/104 |

* cited by examiner

MASTERLESS LOCKS IN A MULTI-NODE ENVIRONMENT

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. A hardware or software failure affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from hardware and software failures.

Most complex business applications are run not on a single computer system, but in a distributed system in which multiple computer systems, referred to as nodes, each contribute processing resources and perform different tasks. In such an environment, disruption due to hardware and software failures can be lessened or prevented using a strategy known as clustering. In a clustered environment, computer systems and storage devices are interconnected, typically at high speeds within a local data center, for the purpose of improving reliability, availability, serviceability, and/or performance via load balancing. Redundant interconnections between the computer systems are typically included as well, and the collection of computer systems, storage devices, and redundant interconnections is referred to herein as a cluster. In some implementations, the cluster appears to users as a single highly available system. Different types of clusters may be established to perform independent tasks, to manage diverse hardware architectures performing similar tasks, or when local and backup computer systems are far apart physically.

In some clustering environments, only one of the computer systems in the cluster provides processing resources with respect to a particular software application. In other clustering environments, processing for a single software application is distributed among nodes in the cluster to balance the processing load.

Within a single computer system, multiple threads executing a given software application may access and/or update the same data. The term 'thread' is used to describe the context in which a computer program is being executed. This context includes the program code, the data for execution of the program code, a stack, a program counter indicating a memory location from which the next instruction will come, and state information. Coordination is necessary to ensure that one thread does not read shared data at the same time that another thread is updating that data, thereby possibly resulting in data inconsistency depending upon the timing of the two operations. In clustering environments where processing for a given software application is "load balanced," threads that share data can be running on different nodes within a cluster.

Coordination between threads accessing shared data is often implemented using locks. Typically, a lock is software that protects a piece of shared data; for example, in a file system, a lock can protect a file or a disk block. In a distributed system, a lock can also protect shared "state" information distributed in memories of each node in the system, such as the online or offline status of a given software application. All shared data is protected by a lock, and locks are typically managed by a lock manager, which often provides an interface to be used by other application programs.

A lock is requested before the calling application program can access data protected by the lock. A calling application program can typically request an "exclusive" lock to write or update data protected by the lock or a "shared" lock to read data protected by the lock. If the calling application program is granted an exclusive lock, then the lock manager guarantees that the calling program is the only thread holding the lock. If the calling program is granted a shared lock, then other threads may also be holding shared locks on the data, but no other thread can hold an exclusive lock on that data.

The lock manager cannot always grant a lock request right away. Consider an example where one thread has an exclusive lock L on a given set of data, and a second thread requests shared access to the given set of data. The second thread's request cannot be granted until the first thread has released the exclusive lock on the given set of data.

A lock can be placed on data that are stored on a shared disk. Locks can also be placed on shared data stored in memory for each node, where the data must be consistent for all nodes in a cluster. For example, nodes in a cluster can share information indicating that a file system is mounted. A lock can be placed on the shared state information when the state of the file system changes from mounted to not mounted, or vice versa.

FIGS. 1 through 4 provide examples of prior art messaging used to implement locks for data sharing. FIG. 1 is a block diagram illustrating prior art initialization of a lock. Two nodes, node 110A and node 110B, share data 152 protected by a lock 150. Lock 150 is managed by lock manager 160, which includes a module on each of nodes 110A and 110B, respectively, lock agent 130 and lock master 140. In many environments, a single lock master exists for each lock, and the lock master resides on one of the nodes. In the example shown, lock master 140 resides on node 110B. Lock master 140 tracks the access levels for a given lock in use on all nodes. Lock master 140 also maintains a queue of unsatisfied locking requests, which lock master 140 grants as threads unlock the corresponding lock. Different locks may have lock masters on different nodes, and all nodes agree on which node masters a given lock.

Each node can have a program that handles access to data protected by each lock. In this example, lock agent 130, a module of lock manager 160, runs on node 110A to provide access to data 152 protected by lock 150. Node 110B may also include another lock agent (not shown) to handle locks for clients on node 110B. If lock agent 130 itself does not have the access level requested by a client, such as client 120, running on node 110A, lock agent 130 calls lock master 140 to request the desired access level for node 110A. Lock master 140 keeps track of the access levels, also referred to as lock levels, held by all of the lock agents, such as lock agent 130, on each node.

Initialization of a lock, such as lock 150, is initiated by a client, or thread, such as client 120 of node 110A. A client calls a lock agent, such as lock agent 130, for the lock protecting the data of interest, such as lock 150. In the embodiment shown in FIG. 1, initialization is performed before the client is ready to use the data and allows a lock agent to prepare for that client's use of the lock. For example, the lock agent may allocate data structures or perform other functions to prepare for the client's use of the lock.

In action 1.1, client 120 running on node 110A requests lock agent 130 to initialize lock 150 on data 152. In action 1.2, lock agent 130 sets up data structures necessary for client 120 to use data 152 protected by lock 150. No communication with lock master 140 is needed to set up the data structures, which are discussed further below with reference to FIG. 3. In action 1.3, lock agent 130 informs client 120 that lock 150 is initialized.

Subsequent requests to initialize locks from client 120 or other clients (not shown) on node 110A can be granted by lock agent 130 by performing actions such as actions 1.1, 1.2, and 1.3. In other embodiments, initializing a lock may include communication with a lock master, such as lock master 140.

FIG. 2 is a block diagram illustrating a prior art first request for access to data protected by a lock that has been initialized and grant of the first request in the environment of FIG. 1. In action 2.1, client 120 requests shared access to data 152 protected by lock 150, which was initialized as described with reference to FIG. 1 above. In action 2.2, lock agent 130 determines that access to lock 150 has not yet been granted to lock agent 130. In action 2.3, lock agent 130 requests shared access to data 152 protected by lock 150 from lock master 140 running on node 110B. Lock master 140 determines in action 2.4 that no other client is currently holding lock 150, and therefore that no contention exists for data 152 protected by lock 150. Contention indicates that other nodes already hold conflicting access levels for this lock. For example, if a node holds shared access to a lock, then no node can be granted exclusive access to data protected by the lock until the shared access is relinquished.

In action 2.5, lock master 140 grants shared access to data 152 protected by lock 150 to lock agent 130. Now that lock agent 130 has been granted shared access to data 152, lock agent can grant shared access to any client running on node 110A that wishes to read data 152. A grant of access to a lock agent, such as lock agent 130, can be viewed as a grant of access to data protected by the lock, here lock 150, corresponding to the lock agent, for the entire node on which the lock agent is running. Lock agent 130 handles requests for access by client processes running on its respective node, in this case, node 110A. In action 2.6, lock agent 130 grants shared access to data 152 protected by lock 150 to client 120.

As shown in FIG. 2, each time lock agent 130 does not have the level of access requested by a client, such as client 120, lock agent 130 sends a message to lock master 140. When a lock agent must communicate with a lock master in order to obtain access to data protected by a lock on behalf of a client, locking is referred to herein as being performed in accordance with a "normal" lock protocol, and the lock itself is referred to as a "normal" lock.

Messaging between nodes is very expensive when compared to normal instruction execution; for example, on a typical computer system, a program can execute 250,000 instructions in the time it takes to send, receive, and process a message. Communicating with other processes on the same node is much less expensive, and therefore it is desirable, when possible, to minimize messages between nodes in favor of communications between processes on the same node. Using lock agents, such as lock agent 130, helps to minimize messaging because the lock agent can grant the access level that the lock agent itself has been granted. However, when the lock agent has not been granted access, the lock agent/lock master scheme still requires significant messaging whenever the lock agent has not already been granted the access level desired and the lock master is running on a different node.

FIG. 3 is a block diagram illustrating a prior art first request for access to data protected by a lock with contention between nodes and a grant of the first request. FIG. 3 is shown in the environment of FIGS. 1 and 2. In action 3.1, client 120 requests exclusive access to data 152 protected by lock 150. In action 3.2, lock agent 130 determines that exclusive access to data 152 protected by lock 150 has not yet been granted to lock agent 130. In action 3.3, lock agent 130 requests exclusive access to data 152 protected by lock 150 from lock master 140 running on node 110B, in accordance with the normal lock protocol.

Lock master 140 determines in action 3.4 that data protected by lock 150 are currently held at a shared access level by lock agent 330 running on node 110C, in contrast to the finding in FIG. 2 that no contention was present. Because the data protected by lock 150 is currently held at a shared access level, exclusive access cannot be granted to lock agent 130. Lock master 140 has three options at this point: (1) wait until the client of lock agent 130 holding lock 150 releases lock 150; (2) grant shared access rather than exclusive access to lock agent 130; or (3) request lock agent 330 to release lock 150.

In this example, lock master 140 takes the third option, and in action 3.5, lock master 140 requests lock agent 330 to lower the access level with which lock agent 330 holds data 152 protected by lock 150. Lowering the access level with which a lock agent holds data protected by a lock is also referred to herein as "lowering the access level for the lock," and locks can be referred to as having an access level. Lowering the access level is also referred to herein as "releasing the access level" or releasing the lock. A request to lower the access level can also be referred to as a revocation request.

In response to the revocation request to lower the lock access level for lock 150, in action 3.6, lock agent 330 waits on clients on node 110C to finish using data 152 so that it can lower the access level of lock 150. In action 3.7, lock agent 330 sends a message indicating that the access level of lock 150 is lowered to a "no lock" access level. Lock master 140 records the fact that lock agent 330 no longer holds lock 150 in a data structure, which is described with reference to FIG. 4 below. No contention exists, which allows exclusive access to be available to lock agent 130.

In action 3.8, lock master 140 grants exclusive access to data 152 protected by lock 150 to lock agent 130. Now that lock agent 130 has exclusive access to data 152, lock agent can grant exclusive access to data 152 protected by lock 150 to client 120.

In this example, an additional message was sent by lock master 140 in action 3.5 between nodes to handle contention for data 152 between nodes 110A and 110B. The other two options described above, waiting until the client of the lock agent holding the lock has released the lock, and granting shared access rather than exclusive access, do not require lock master 140 to send additional messages to lock agent 330. Waiting until lock 150 is released would eliminate action 3.5, where lock master 140 requests lock agent 330 to revoke access to data 152 protected by lock 150. However, access to data 152 by client 120 would be delayed until lock agent 330 voluntarily releases lock 150 on data 152. Granting shared access instead of exclusive access would change actions 3.8 and 3.9 to grant shared rather than exclusive access, and would eliminate action 3.5. However, a grant of shared rather than exclusive access would not satisfy the need of client 120, possibly resulting in additional messaging for client 120 to obtain the access level needed.

FIG. 4 is an example of prior art data structures maintained by the lock agent and lock master of FIGS. 1 through 3. Lock agent 130 of FIG. 1 (not shown) maintains lock agent data structure 432 to track access levels granted to the node on which lock agent 130 resides, node 110A of FIG. 1 (not shown). For each lock, lock agent data structure 432 includes lock identifier 434, the current access level for this node 436, and state information 438. State information 438 enables lock agent 130 to manage multiple requests for the lock identified by lock identifier 434.

Lock master 140 of FIG. 1 (not shown) maintains lock master data structure 442 to track access levels granted to each node. In some embodiments, lock master 140 may track each lock request from each thread on every node, and the data structure in such an embodiment would track lock- and thread-level information. In this example, lock master data structure 442 includes lock identifier 444, access level for node X 446X, access level for node Y 446Y, and access level for node Z 446Z, and state information 448.

As illustrated in this example, communication to request and grant locks in a multi-node environment has heretofore been very expensive and significantly reduces time available for processing instructions. What is needed is a system that minimizes messaging between nodes, while allowing locks to be used to enable data sharing among multiple threads running on the nodes.

SUMMARY OF THE INVENTION

A method, system, application programming interface, computer system, and computer program product to provide locks for controlling access to data by nodes in a multi-node system while minimizing the number of messages sent between nodes. In one embodiment, a multi-node knowledge agent has knowledge of locks distributed among the nodes in the multi-node system. Based upon this knowledge, the multi-node knowledge agent can determine when no other node is accessing data protected by a given lock and when an event has occurred that precedes a request by another node to access data protected by the given lock. When no node is accessing the data and no event preceding a request to access the data has occurred, the multi-node knowledge agent can designate that given lock as "masterless." When a lock is designated masterless, a lock agent on one node is authorized to subsequently grant access to the data protected by that given lock without communicating with a lock master, which may reside on another node. Designating a lock as masterless thereby minimizes messages sent between nodes.

In one embodiment, when the multi-node knowledge agent obtains information that an event has occurred that precedes a request by another node to access the data protected by the masterless lock, the multi-node knowledge agent requests the lock agent holding the masterless lock to change the type of the lock from masterless to normal. The lock agent subsequently communicates with the lock master to raise an access level for the data protected by the now-normal lock. In some situations, the lock master must be created before the lock agent can communicate with the lock master to raise the access level.

BRIEF DESCRIPTION OF THE DRAWINGS

The present invention may be better understood, and its numerous objectives, features, and advantages made apparent to those skilled in the art by referencing the accompanying drawings.

The use of the same reference symbols in different drawings indicates similar or identical items.

DETAILED DESCRIPTION

Figure 1:
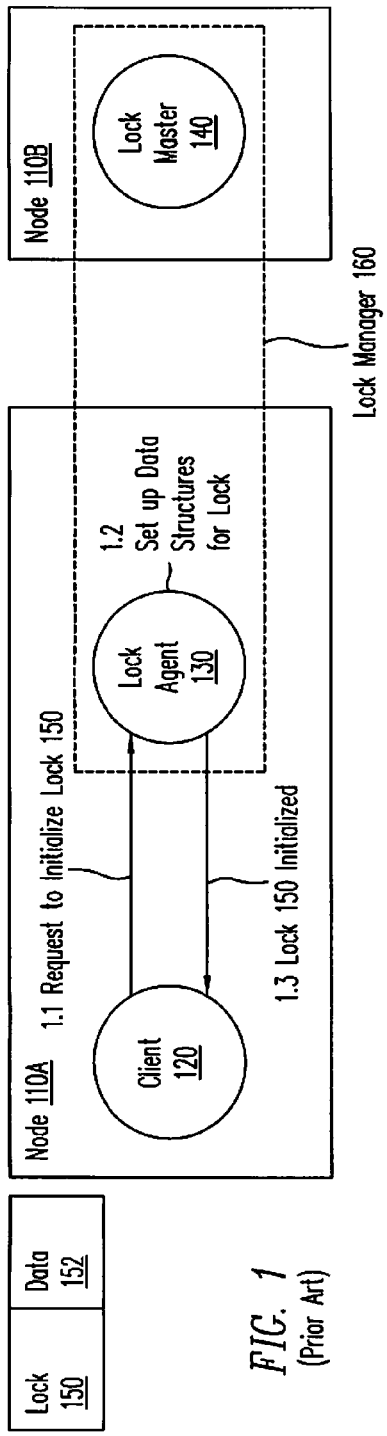
FIG. 1 is a block diagram illustrating prior art initialization of a lock, as described above.
Figure 2:
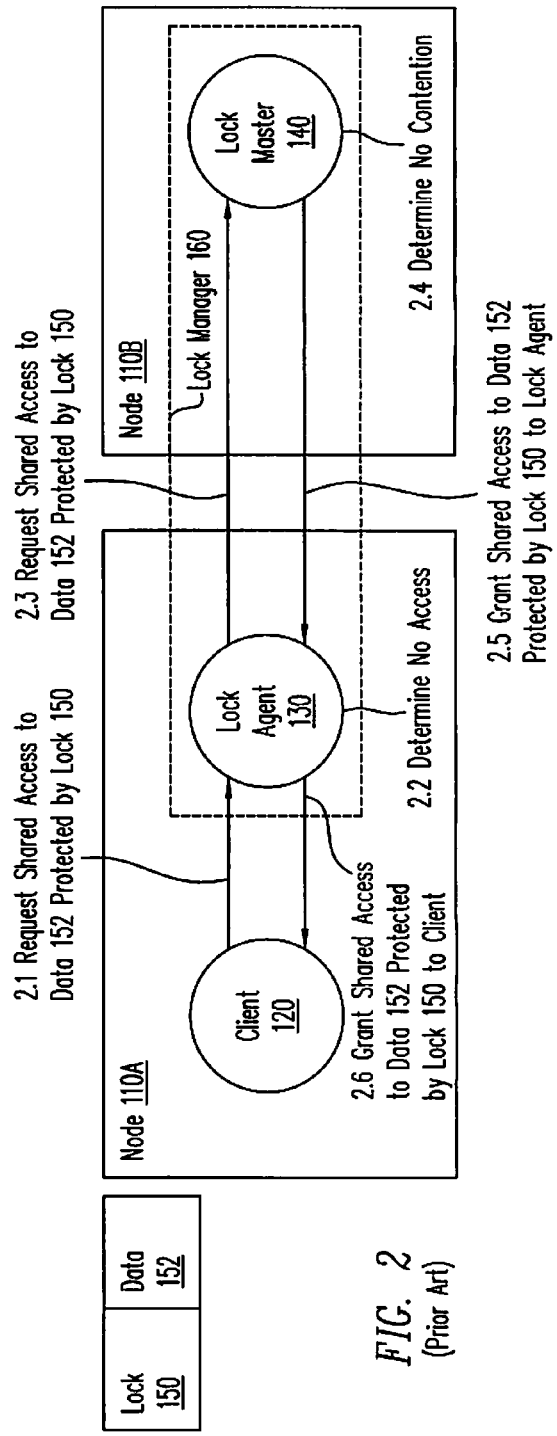
FIG. 2 is a block diagram illustrating a prior art first request for access to data protected by a lock and grant of the first request in the environment of FIG. 1, as described above.
Figure 3:
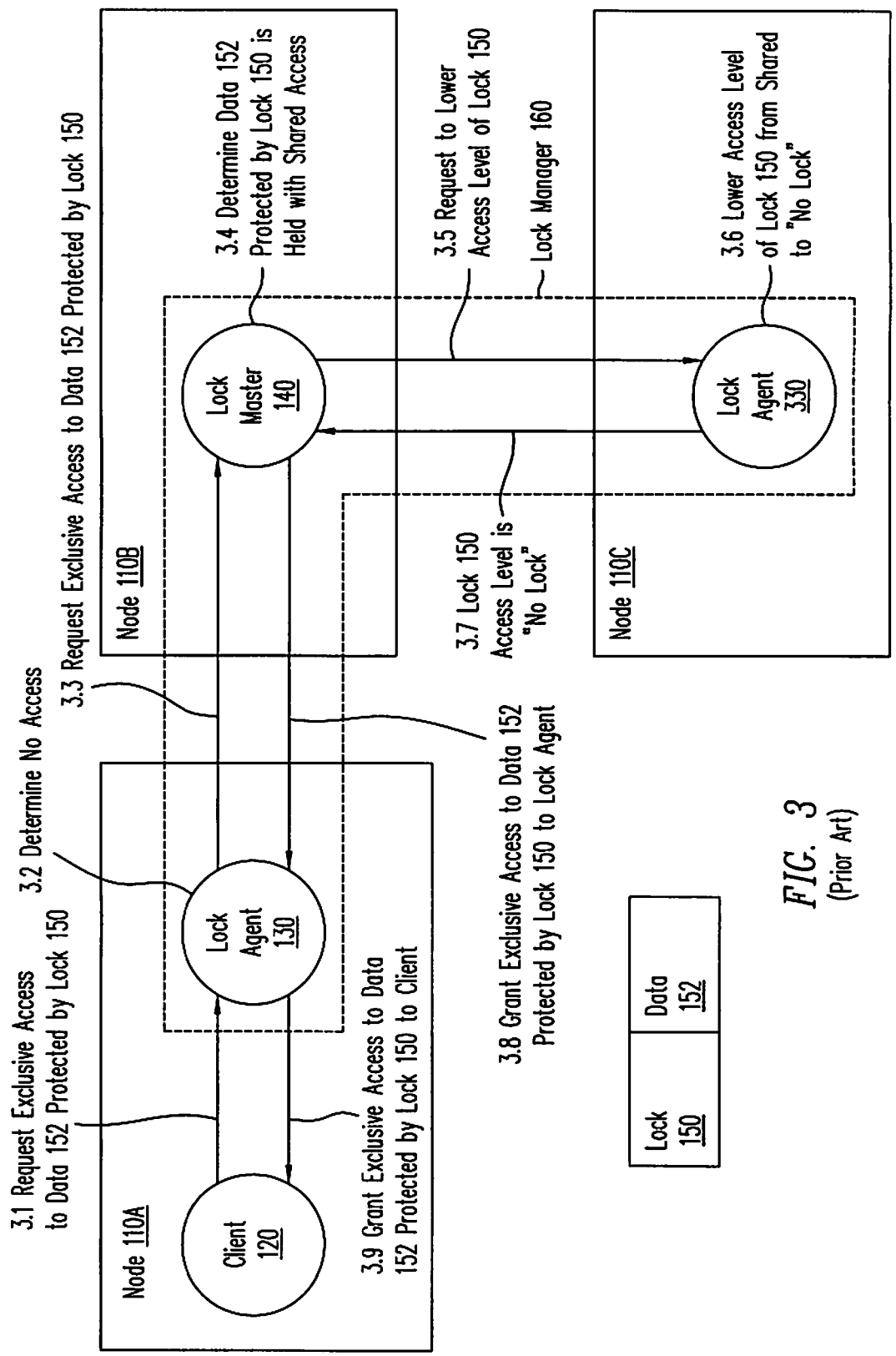
FIG. 3 is a block diagram illustrating a prior art first request for access to data protected by a lock with contention between nodes, and a grant of the first request, as described above.
Figure 4:
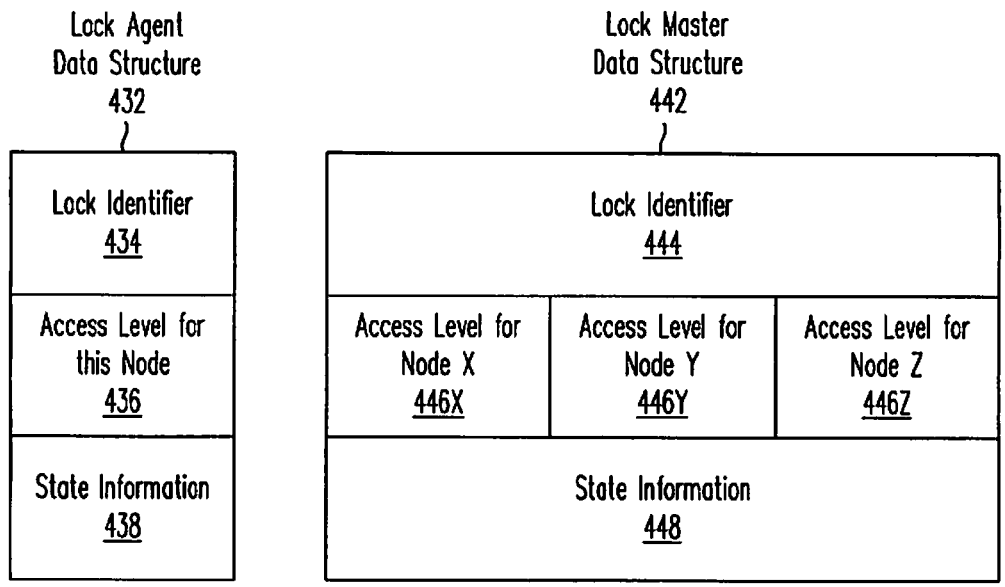
FIG. 4 is an example of prior art data structures maintained by the lock agent and lock master of FIGS. 1 through 3, as described above.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as Can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

INTRODUCTION

The present invention provides locks for controlling access to data by nodes in a multi-node system while minimizing the number of messages sent between nodes. In one embodiment, a lock agent on a given node can be granted an access level for a lock protecting data shared with other nodes. A lock agent, such as lock agent 130, keeps track of the access level that has been granted to the node. In one embodiment, access levels for a node to a given lock include the following:

None—This node has no rights for the given lock and therefore cannot access data protected by the lock.

Shared—The data protected by the lock can be shared by multiple nodes. A shared access level is sometimes referred to as a "read access level," because multiple nodes can be allowed to read data protected by a lock.

Exclusive—This node has exclusive use of the lock and data protected by the lock. Only one node can have exclusive access to a given lock at the same time; when the node has exclusive access, that node is the only node using data protected by the lock. An exclusive access level is sometimes referred to as a "write access level," because only one node should be allowed to write to the data protected by the lock at a given point in time.

In one embodiment, a multi-node knowledge agent has knowledge of lock usage by the nodes in the multi-node system. Based upon this knowledge, the multi-node knowledge agent can determine when no other node is accessing data protected by a given lock. In addition, the multi-node knowledge agent can determine when an event has occurred that precedes a request by another node to access data protected by the given lock. When no other node is accessing data protected by a given lock and no event preceding a request to access data protected by that given lock has occurred, the multi-node knowledge agent can designate that given lock as "masterless." When a given lock is designated masterless, a lock agent on the node hosting the multi-node knowledge agent is authorized to subsequently grant access to the data protected by that given lock to clients on that node without communicating with a lock master, which may reside on another node. Designating a lock as masterless thereby minimizes messages sent between nodes.

In one embodiment, when the multi-node knowledge agent obtains information that an event has occurred that precedes a request by another node to access data protected by a masterless lock, the multi-node knowledge agent requests the lock agent holding the masterless lock to change the type of the lock from masterless to normal. In one embodiment, the lock is changed from masterless to normal and a lock master is created before the other node requests access to the data protected by the lock. When the lock master is created, the lock agent informs the lock master of the access level that the lock agent currently holds. Subsequently, the lock agent communicates with the lock master to change a client's access level to the data protected by the now-normal lock.

The present invention is described herein within the context of a clustering environment, although one of ordinary skill in the art will recognize that the invention equally applies to other multi-node environments and is not intended to be limited to use in a clustering environment.

Figure 5:
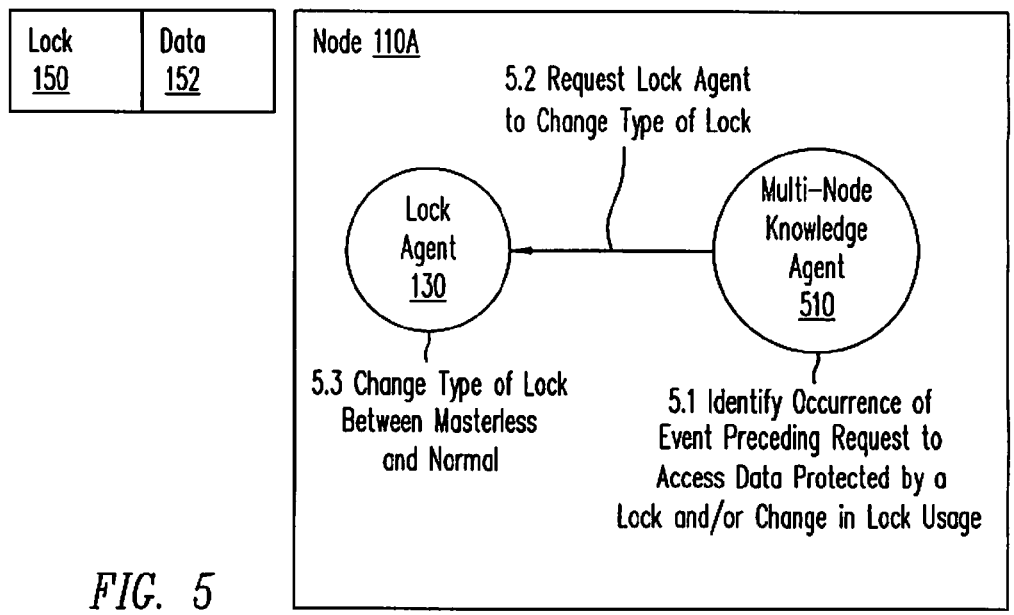
FIG. 5 is a block diagram showing a request to change the type of a given lock and a subsequent change in the type of the lock.

FIG. 5 is a block diagram showing a request to change the type of a given lock and a subsequent change in the type of the lock. In one embodiment, the type of lock can be changed from masterless to normal or from normal to masterless. In FIG. 5, this request is made to the lock agent by a multi-node knowledge agent 510. The particular form of the multi-node knowledge agent 510 can vary; in the embodiment shown, each node is assumed to have its own multi-node knowledge agent, such as multi-node knowledge agent 510, which can obtain knowledge about the usage of locks by other nodes in the multi-node environment. In one embodiment, the multi-node knowledge agent 510 resides within a client of the lock manager 160 of FIG. 1, such as client 120 of FIG. 1. For example, the client of the lock manager may be a file system for a clustered environment, where the file system for the clustered environment has a multi-node knowledge module that is knowledgeable about lock usage throughout the cluster of nodes. In other embodiments, the multi-node knowledge agent could be implemented within lock manager 160, as an independent process running on a server node, or as a distributed module with components running on some or all nodes.

It is preferable that a multi-node knowledge component run on each node such that inter-node communication is not necessary to make a lock masterless. The functionality of multi-node knowledge agent 510 need not be implemented in a single functional module, thread, process, or subroutine; for example, functionality to recognize a need to change the type of a lock may be scattered as a few lines of code implementing pieces of the functionality in each of multiple modules, such as client 120, lock manager 160, and so on.

Because a multi-node knowledge agent, such as multi-node knowledge agent 510, authorizes a lock agent on the node hosting the multi-node knowledge agent to subsequently raise an access level for a lock protecting shared data without communicating with a lock master, a multi-node knowledge agent can be referred to as an authorizing means, module, or instructions.

In action 5.1, multi-node knowledge agent 510 becomes aware of the occurrence of an event that precedes a request to access data protected by a given lock or a change in lock usage of the given lock, in this case, lock 150. For example, multi-node knowledge agent 510 may become aware that data 152 protected by lock 150 have been released and lock 150 is not in use, or multi-node knowledge agent 510 may become aware that an event has occurred preceding a request by another node to access data 152 protected by lock 150. If the event occurs that precedes a request by another node to access data 152, lock 150 is converted to a normal lock that can handle requests for conflicting access levels by multiple nodes.

In action 5.2, depending upon the nature of action 5.1, multi-node knowledge agent 510 requests lock agent 130 of node 110A to change the type of the given lock from masterless to normal or from normal to masterless. Multi-node knowledge agent 510 uses an application programming interface to communicate with lock agent 130. The application programming interface can include a command to change the type of a lock, in this case, lock 150 protecting data 152. In one embodiment, the type of the lock can be changed from masterless to normal or from normal to masterless. Other embodiments may provide additional types of locks. The application programming interface can also include a command to authorize a first node to raise an access level for a lock protecting data shared by nodes in the multi-node environment without communicating with a lock master on another node.

In action 5.3, lock agent 130 changes the type of the given lock from a masterless lock to a normal lock if the event has occurred preceding a request by another node to access the data, or from a normal lock to a masterless lock if the lock is not in use and such an event has not occurred. In one embodiment, the conversion of a masterless lock to a normal lock is completed prior to any request to access data by the node(s) following the occurrence of the event. Because a lock agent is responsible for changing the type of the lock, the lock agent can also be referred to as a changing means, module, or instructions. In addition, because a multi-node knowledge agent determines that an event preceding a request to raise the access level by another node has occurred, the multi-node knowledge agent can be referred to as a determining means, module, or instructions.

In one embodiment, when a lock is changed from a normal lock to a masterless lock, a message is sent to a lock master for the lock requesting the lock master to terminate. The lock master may reside on a different node than the now-masterless lock. Therefore, when the lock is changed back from a masterless lock to a normal lock, a lock master may need to be created for the now-normal lock, and a message may need to be sent to another node to create the lock master.

Multi-node knowledge agent 510 can obtain such awareness of changes in the lock usage or in the occurrence of events that precede a request to use a lock in a variety of ways, depending upon the particular multi-node environment implementation. For example, the given lock may be part of a "block" of locks that are managed together by a block manager, as described in U.S. patent application Ser. No. 10/260,805 filed on Sep. 30, 2002, entitled "Block Locking in a Multi-Node Environment, and naming as inventors Anurag Agarwal and Harold B. Prince, Jr. This application is hereby incorporated by reference in its entirety and for all purposes. The block manager of U.S. patent application Ser. No. 10/260,805 corresponds to multi-node knowledge agent 510 in that environment.

Another example of a way that multi-node knowledge agent 510 can become aware of a change in the lock usage and/or of occurrence of an event that precedes a request for access to a given lock is when the given lock is used in conjunction with a second lock. Consider a situation where a given set of data has two locks, called A and B. Any use of the set of data requires that the code using the data hold lock A at either an exclusive or shared access level, depending upon the intended use of the data. Some actions on the set of data require that the code also hold lock B. The B lock can also be held at an exclusive or shared access level, and the access level for lock B is independent of the access level of lock A.

If code on a particular node obtains exclusive access to the set of data protected by lock A, multi-node knowledge agent 510 can conclude that lock B can be masterless. As a result, the lock agent on the particular node holding exclusive access to the set of data protected by lock A can grant access to data protected by lock B without communicating with a lock master. The reason that this conclusion can be drawn is that any other node would first have to obtain access to the set of data protected by lock A before obtaining access to the data protected by lock B. As long as one node holds exclusive access to the set of data protected by lock A, no other node can obtain access to the data protected by lock A or, as a result, to the data protected by lock B. When a node obtains exclusive access to lock A, this event prevents other nodes from requesting access to data protected by lock B.

Similarly, if the particular node lowers its access level to data protected by lock A from an exclusive access level to a shared access level or to no access, multi-node knowledge agent 510 can conclude that lock B should be changed from a masterless lock to a normal lock. This conclusion can be made because other nodes are no longer prevented from obtaining access to the set of data protected by lock A, and thus, are no longer prevented from requesting access to the set of data protected by lock B. The event of lowering the access level of lock A precedes a request by other nodes to raise the access level of lock B. A lock master is needed to evaluate the conflicting requests by different nodes for access to the set of data, and a lock master is created and the lock converted to a masterless lock before the other nodes actually request access to the set of data protected by lock B. An example of changing a lock from masterless to normal is provided below with reference to FIG. 8.

In the example with locks A and B, lock B is made masterless, but lock A is not. In this embodiment, lock A remains a normal lock because other nodes are still free to request access to data protected by lock A. If one node holds lock A with an exclusive access level, other nodes are not prevented from requesting access to data protected by lock A. Furthermore, once a node holds exclusive access to data protected by lock A, that node has no need to communicate with a lock master, so making lock A masterless may not improve performance.

Figure 6:
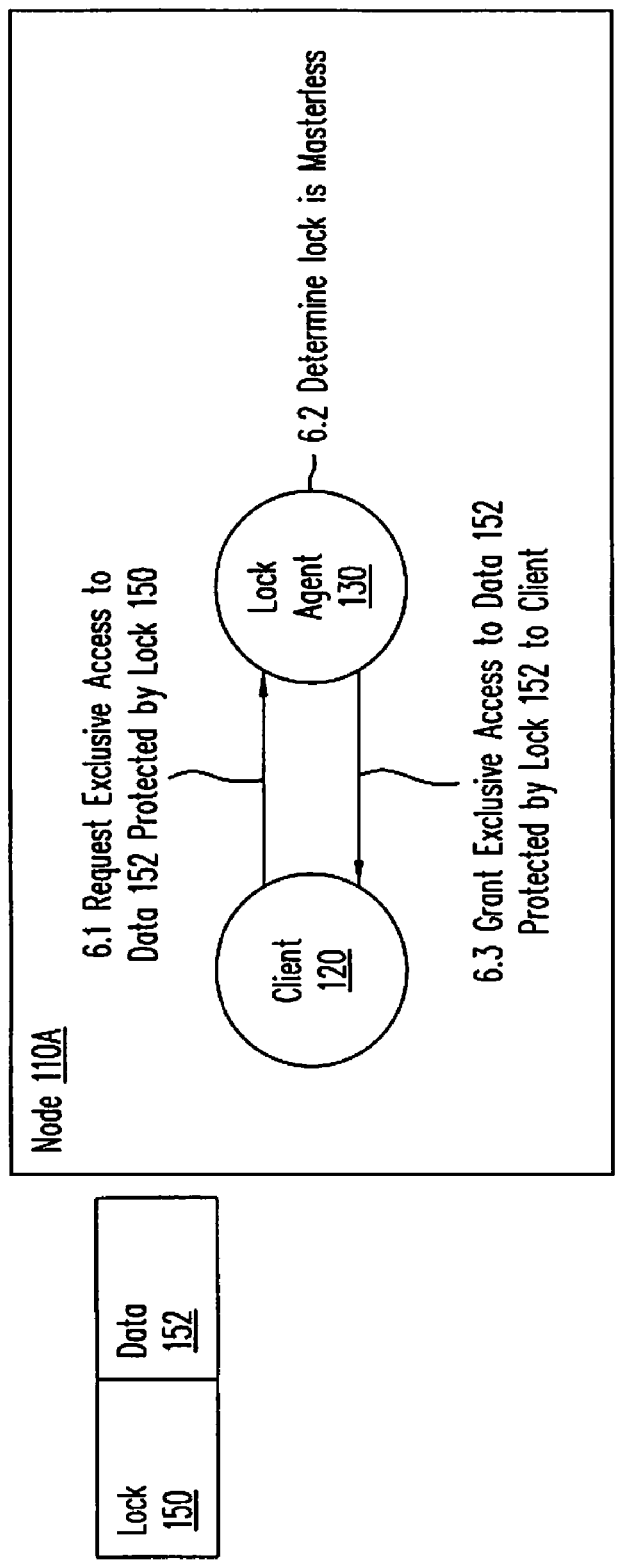
FIG. 6 is a block diagram illustrating a request to raise an access level for data protected by a lock, a determination that the lock is masterless (i.e., that access can be granted without communicating with a lock master), and a grant of the raised access level to the data.

FIG. 6 is a block diagram illustrating a request for exclusive access to data protected by a lock, a determination that the lock is masterless, and a grant of exclusive access to the data without requesting permission from a lock master. In action 6.1, client 120 requests exclusive access to data 152 protected by lock 150.

In action 6.2, lock agent 130 determines that lock 150 is masterless on node 110A (for example, as a result of having changed the type of lock 150 to masterless in response to the request by multi-node knowledge agent 510 in FIG. 5). In action 6.3, lock agent 130 grants exclusive access to data 152 protected by lock 150 without communicating with a lock master.

Figure 7:
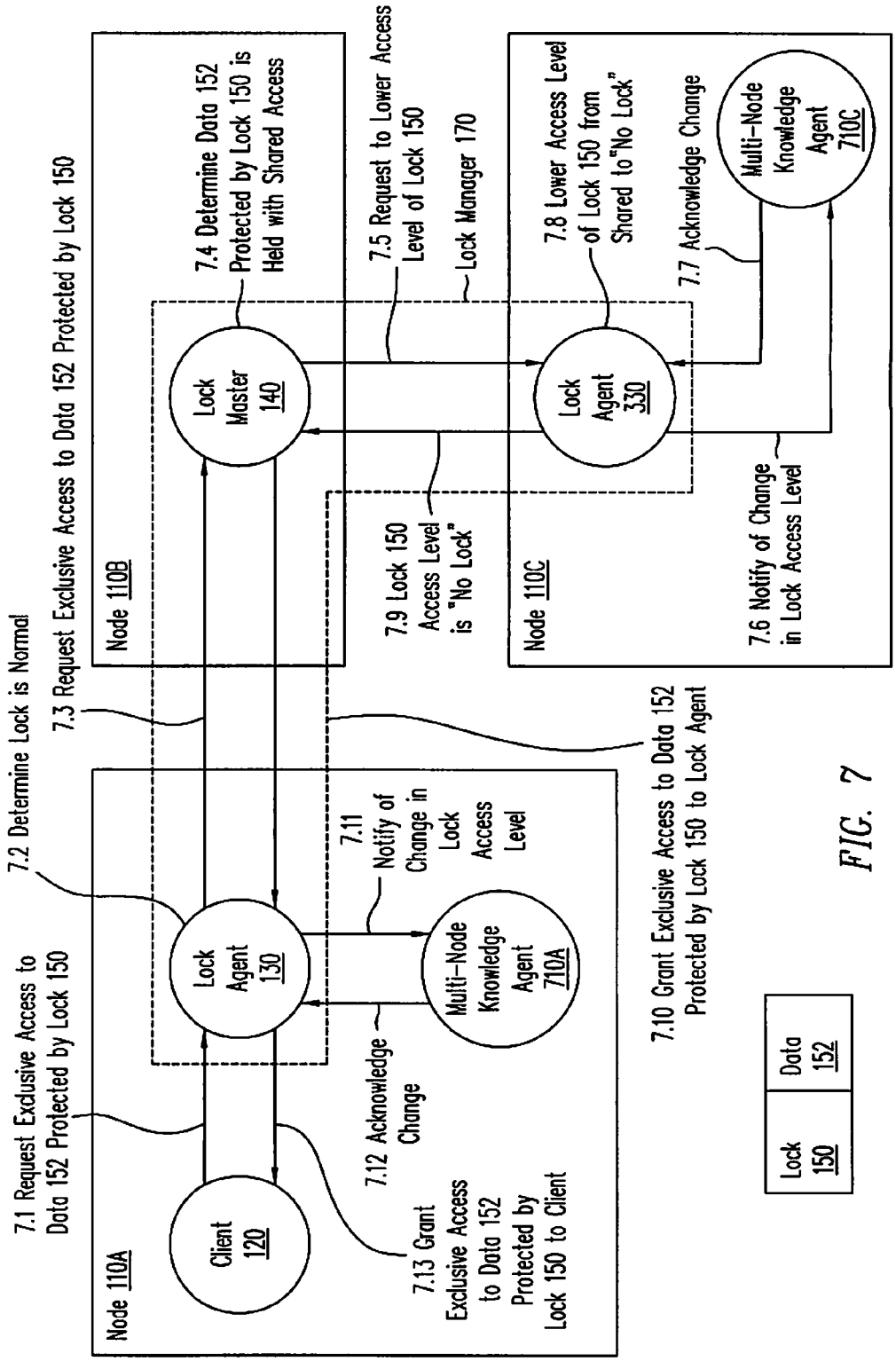
FIG. 7 is a block diagram showing a request for exclusive access to data protected by a normal lock, and the subsequent notification of a multi-node knowledge agent that the lock access level has changed.

FIG. 7 is a block diagram showing a request for exclusive access to data protected by a normal lock, and the subsequent notification of a multi-node knowledge agent that the lock access level has changed. FIG. 7 provides another example of a way in which a multi-node knowledge agent becomes aware of a change in the usage of a lock.

In action 7.1, client 120 of node 110A requests exclusive access to data 152 protected by lock 150. In action 7.2, lock agent 130 determines that lock 150 is a normal lock, and thus that permission to raise the access level held for the lock must be requested from a lock master. In action 7.3, lock agent 130 requests exclusive access to data 152 protected by lock 150 from lock master 140 on node 110B. In action 7.4, lock master 140 determines that data 152 protected by lock 150 is held with shared access by another node, node 110C. Lock master 140 has three options at this point: (1) wait until the client of lock agent 330 on node 110C holding lock 150 releases lock 150; (2) grant shared access rather than exclusive access to lock agent 130; or (3) request lock agent 330 on node 110C to release lock 150. In this example, in action 7.4, lock master 140 requests lock agent 330 to release lock 150.

In action 7.6, lock agent 330 notifies corresponding multi-node knowledge agent 710C on node 110C of a pending change in the access level for lock 150 from "shared access" to "no access." In action 7.7, multi-node knowledge agent 710C acknowledges the change in the access level for lock 150.

In action 7.8, lock agent 330 lowers the access level of lock 150 from "shared access" to "no lock" (i.e., no access). In action 7.9, lock agent 330 replies to lock master 140 indicating that the lock access level for lock 150 has been changed to "no lock." In action 7.10, lock master 140 grants exclusive access to data 152 protected by lock 150 to lock agent 130. In action 7.11, lock agent 130 notifies multi-node knowledge agent 710A of the change in the access level for lock 150 (to exclusive access on node 110A). In action 7.12, multi-node knowledge agent acknowledges the change in the access level for lock 150. In action 7.13, lock agent 130 grants the request for exclusive access to data 152 protected by lock 150 to the requesting client, client 120.

The notifications in actions 7.6 and 7.11 are examples of another way in which multi-node knowledge agents, herein multi-node knowledge agent 710A on node 110A and multi-node knowledge agent 710C on node 110C, become aware of a change in a lock access level, in this case, for lock 150. In this example, lock agents on the respective nodes notify corresponding multi-node knowledge agents. In one embodiment, the multi-node knowledge agent has the opportunity upon receiving such notification to allow clients on that node to complete tasks before the lock access level changes. For example, multi-node knowledge agent 710C may allow clients on node 110C to complete read operations on data 152 before acknowledging the notification, thereby delaying the change in the access level for the lock.

Figure 8:
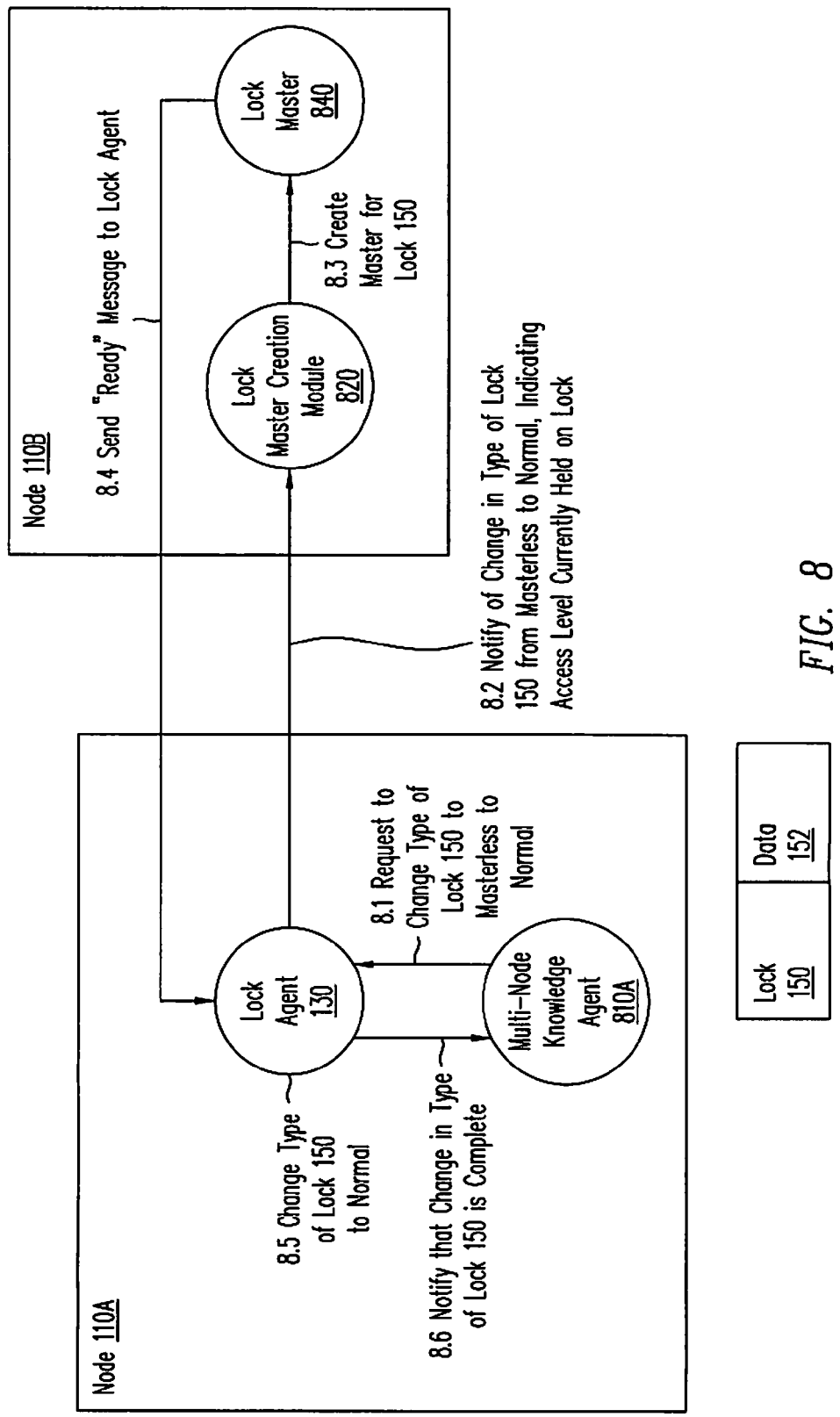
FIG. 8 is a block diagram showing a change in the type of a lock from a masterless lock to a normal lock.

FIG. 8 is a block diagram showing a change in the type of a lock from a masterless lock to a normal lock. Assume that lock agent 130 has been granted authorization to treat lock 150 as a masterless lock, such that lock agent 130 does not currently request permission from a lock master for lock 150 to grant access to data 152 protected by lock 150 to processes running on node 110A. Also assume that multi-node knowledge agent 810A becomes aware that an event has occurred that precedes a request by another node to access data 152 protected by lock 150, such that a lock master is needed to resolve the conflicting requests for access. In action 8.1, multi-node knowledge agent 810A on node 110A requests lock agent 130 to change the type of lock 150 from masterless to normal. A lock master is created and the lock is normalized before the other node can request access to data 152.

It is possible that a masterless lock has no lock master; for example, if the masterless lock never existed as a normal type of lock, a lock master may not have been created. In addition, in one embodiment, if a lock is changed from a normal lock to a masterless lock, the lock master for the lock is terminated to free resources. Assume that no lock master for lock 150 currently exists. In action 8.2, lock agent 130 sends a message to node 110B, which is the agreed-upon node to host a lock master for lock 150. In the message, lock agent 130 notifies a lock master creation module 820 on node 110B of a pending change in the type of lock 150 and indicates the lock access level currently held by lock agent 130 on node 110A for the lock. In action 8.3, multi-node knowledge agent 810B creates lock master 840 for lock 150 on node 110B. In action 8.4, lock master 840 sends a "ready" message to lock agent 130, indicating that lock master 840 is ready to respond to requests for access to data 152 protected by lock 150. In action 8.5, lock agent 130 changes the type of lock 150 from masterless to normal, thereby requiring that requests for raising an access level for data 152 protected by lock 150 are sent to lock master 840. In action 8.6, lock agent 130 notifies multi-node knowledge agent 810A on node 110A that the change in the type of lock 150 from masterless to normal is complete.

The advantages of masterless locks include enabling data sharing while enhancing performance and reducing cost by minimizing the number of messages passed between the nodes in a multi-node environment. Masterless locks can be implemented in a multi-node environment using a variety of computer systems and networks. An example of one such computing and network environment is described below with reference to FIGS. 9 and 10.

An Example Computing and Network Environment

Figure 9:
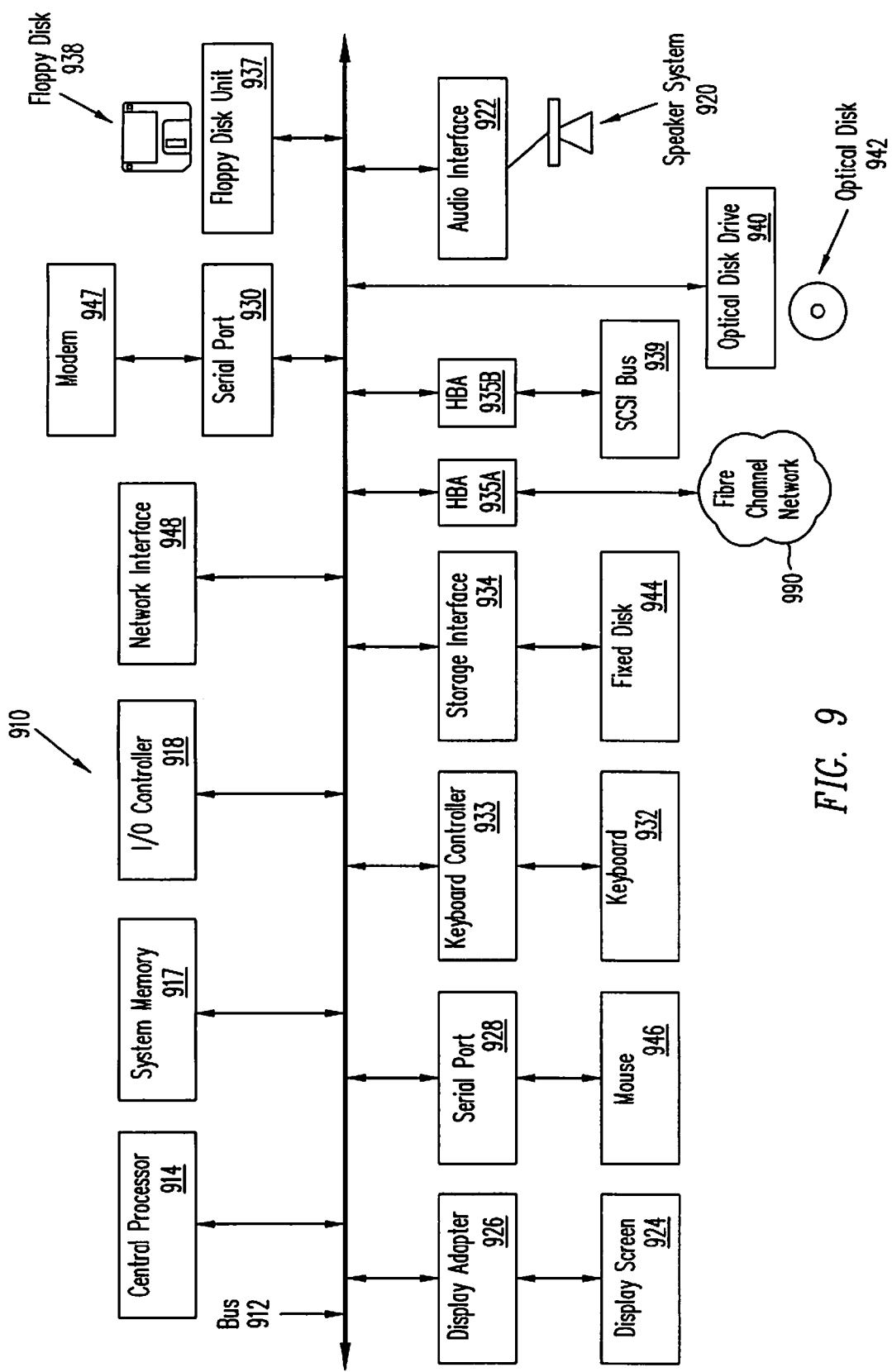
FIG. 9 is a block diagram illustrating a computer system suitable for implementing embodiments of the present invention.

FIG. 9 depicts a block diagram of a computer system 910 suitable for implementing the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a fibre channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), floppy disk unit 937 or other storage medium. Additionally, applications may be in the form of electronic signals modulated in accordance with the application and data communication technology when accessed via network modem 947 or interface 948.

Storage interface 934, as with the other storage interfaces of computer system 910, may connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 9 to be present to practice the present invention. The devices and subsystems may be interconnected in different ways from that shown in FIG. 9. The operation of a computer system such as that shown in FIG. 9 is readily known in the art and is not discussed in detail in this application. Code to implement the present invention may be stored in computer-readable storage media such as one or more of system memory 917, fixed disk 944, optical disk 942, or floppy disk 938. Additionally, computer system 910 may be any kind of computing device, and so includes personal data assistants (PDAs), network appliance, X-window terminal or other such computing devices. The operating system provided on computer system 910 may be MS-DOS®, MS-WINDOWS®, OS/2®t, UNIX®, Linux®, or another known operating system. Computer system 910 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 910). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 10:
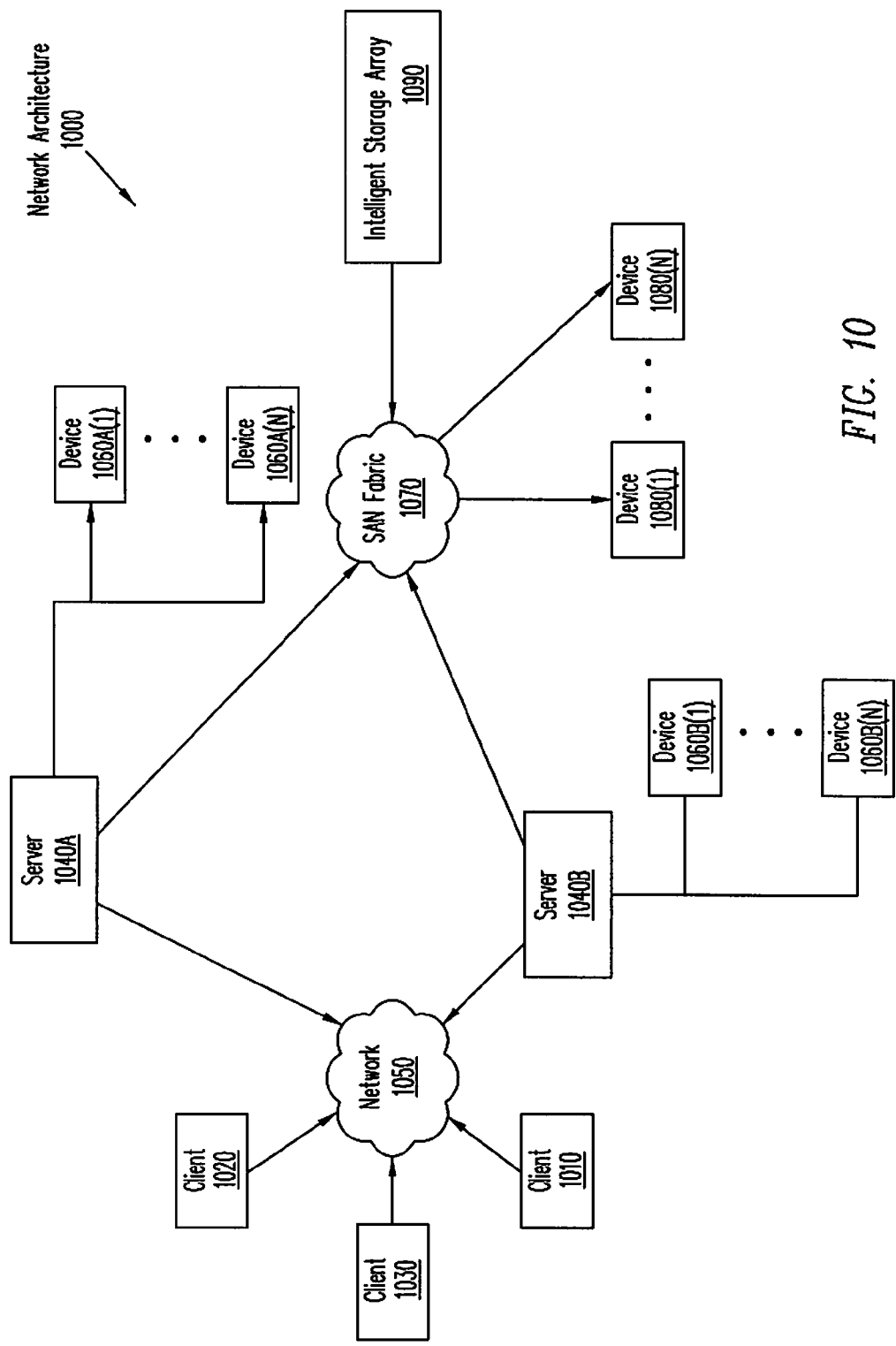
FIG. 10 is a block diagram illustrating a network environment in which locking according to embodiments of the present invention may be used.

FIG. 10 is a block diagram depicting a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   determining that none of a plurality of nodes is accessing data protected by a lock;
   determining, for at least all but a first node of the plurality of nodes, that no event has occurred preceding a request to access the data protected by the lock;
   requesting termination of a lock master for the lock, in response to determining that none of the plurality of nodes is accessing data protected by the lock and that, for at least all but the first node of the plurality of nodes, no event has occurred preceding the request to access data protected by the lock;
   granting access to the data protected by the lock to clients of the first node; and
   authorizing the first node to raise an access level for the lock.

2. The method of claim 1 wherein
   the lock is a masterless lock.

3. The method of claim 1 wherein
   raising the access level comprises at least one of:
   changing the access level from shared access to exclusive access;
   changing the access level from no access to shared access; and
   changing the access level from no access to exclusive access.

4. The method of claim 1 further comprising:
   if a type of the lock is not masterless, changing the type of the lock to masterless.

5. The method of claim 1 further comprising:
   changing a type of the lock based upon a change to an access level of a second lock.

6. The method of claim 1 further comprising:
   changing a type of the lock based upon a change to an access level of a block comprising a plurality of locks, wherein
   the block comprises the lock.

7. The method of claim 1 further comprising:
   determining that an event has occurred, wherein the event precedes a request to raise the access level by a second node of the plurality of nodes.

8. The method of claim 1 further comprising:
   subsequently changing a type of the lock such that communicating with a second node is required to raise the access level; and
   requesting a new lock master for the lock.

9. The method of claim 8 wherein
   the subsequently changing the type of the lock occurs when an event occurs that precedes a request by a third node of the plurality of nodes to raise the access level for the lock.

10. The method of claim 9 wherein
    the third node and the second node are the same node.

11. The method of claim 9 wherein
    the subsequently changing the type of the lock comprises:
    changing the type of the lock to normal.

12. The method of claim 1 further comprising:
    granting access to the data protected by the lock to clients of the first node without communicating with another node of the plurality of nodes.

13. A computer system comprising:
    a processor for executing instructions;
    a memory to store the instructions, wherein the instructions comprise instructions for:
    determining that none of a plurality of nodes is accessing data protected by a lock;
    determining, for at least all but a first node of the plurality of nodes, that no event has occurred preceding a request to access the data protected by the lock;
    requesting termination of a lock master for the lock, in response to determining that none of the plurality of nodes is accessing data protected by the lock and that, for at least all but the first node of the plurality of nodes, no event has occurred preceding the request to access data protected by the lock;
    granting access to the data protected by the lock to clients of the first node; and
    authorizing the first node to raise an access level for the lock.

14. The computer system of claim 13 wherein the instructions further comprise instructions for:
    changing a type of the lock to masterless.

15. The computer system of claim 13 wherein the instructions further comprise instructions for:
    determining that an event has occurred, wherein
    the event precedes a request to raise the access level by a second node of the plurality of nodes.

16. The computer system of claim 15 further comprising instructions for:
    changing a type of the lock upon determining that the event has occurred such that communicating with the second node is required to raise the access level.

17. A computer-readable medium comprising instructions for:
    determining that none of a plurality of nodes is accessing data protected by a lock;
    determining, for at least all but a first node of the plurality of nodes, that no event has occurred preceding a request to access the data protected by the lock;
    requesting termination of a lock master for the lock, in response to determining that none of the plurality of nodes is accessing data protected by the lock and that, for at least all but the first node of the plurality of nodes, no event has occurred preceding it the request to access data protected by the lock;

granting access to the data protected by the lock to clients of the first node; and authorizing the first node to raise an access level for the lock.

18. The computer-readable medium of claim 17 further comprising instructions for:

changing a type of the lock to masterless.

19. The computer-readable medium of claim 17 further comprising instructions for:

determining that an event has occurred, wherein the event precedes a request to raise the access level by a second node of the plurality of nodes.

20. The computer-readable medium of claim 19 further comprising instructions for:

changing a type of the lock upon determining that the event has occurred such that communicating with the second node is required to raise the access level.

* * * * *

UNITED STATES PATENT AND TRADEMARK OFFICE
CERTIFICATE OF CORRECTION

| | |
|---|---|
| PATENT NO. | : 7,340,743 B1 |
| APPLICATION NO. | : 10/423146 |
| DATED | : March 4, 2008 |
| INVENTOR(S) | : Anurag Agarwal et al. |

Page 1 of 1

It is certified that error appears in the above-identified patent and that said Letters Patent is hereby corrected as shown below:

Title Page, Item (75), Inventors: please delete

"Anurag Anural" and insert -- Anurag Agarwal --.

Signed and Sealed this

Tenth Day of June, 2008

JON W. DUDAS
*Director of the United States Patent and Trademark Office*